US008135663B2

(12) United States Patent
Abadi

(10) Patent No.: US 8,135,663 B2
(45) Date of Patent: Mar. 13, 2012

(54) AUTOMATED MANY-SORTED THEOREM PROVER

(75) Inventor: Aharon Abadi, Eilat (IL)

(73) Assignee: International Business Machines Corporation, Armonk, NY (US)

( * ) Notice: Subject to any disclaimer, the term of this patent is extended or adjusted under 35 U.S.C. 154(b) by 1016 days.

(21) Appl. No.: 12/060,278

(22) Filed: Apr. 1, 2008

(65) Prior Publication Data
US 2009/0248391 A1    Oct. 1, 2009

(51) Int. Cl.
*G06F 15/18* (2006.01)
(52) U.S. Cl. .............. 706/62; 706/45; 706/47
(58) Field of Classification Search .......... 706/62, 706/45–47
See application file for complete search history.

(56) References Cited

U.S. PATENT DOCUMENTS

| 5,481,700 | A  | 1/1996 | Thuraisingham |
| 5,596,682 | A  | 1/1997 | Yamazaki et al. |
| 5,640,567 | A  | 6/1997 | Phipps |
| 6,424,962 | B1 | 7/2002 | Billon et al. |

OTHER PUBLICATIONS

"Conditional Term Rewriting and First-Order Theorem Proving", David A. Plaisted, G. D. Alexander, Heng Chu, Shie-Jue Lee, Conditional Term Rewriting Systems, Lecture Notes in Computer Science, 1993, vol. 656, pp. 257-271.*
"The Completeness of Logic Programming with Sort Predicates", Ken Kaneiwa, Systems and Computers in Japan, vol. 35, No. 1, 2004 pp. 37-46.*
Cohn, et al., "A More Expressive Formulation of Many Sorted Logic," Journal of Automatic Reasoning 3, 1987, pp. 113-200.
Paulson et al., "The Foundation of a Generic Theorem Prover," University of Cambridge, pp. 1-36, Journal of Automated Reasoning, vol. 5 No. 3, 1989.

* cited by examiner

*Primary Examiner* — Jeffrey A Gaffin
*Assistant Examiner* — Mai T Tran
(74) *Attorney, Agent, or Firm* — Connolly Bove Lodge & Hutz LLP; Daniel P. Morris, Esq.

(57) ABSTRACT

The present invention is a method for automatic proving using many-sorted first-order logic. Embodiments of the invention apply a modified method of resolution of first-ordered logic. The method of resolution further comprises: processing at least one first sentence (P1) and at least one second sentence (Q1), wherein each of the at least one first sentence and the at least one second sentence contain literals (Pi, Qi). In addition, the method also restricts a unifying process in the method of resolution; determines the literals (Pi) of the at least one first sentence; negates the literals (Qi) of the at least one second sentence of the restricted unifying process; provides the determined literals (Pi') and negated literals (Qi") to the restricted unifying process; chooses a substitution list in the restricted unifying process with a predetermined type; and derives a resolvent sentence in response to the restricted unifying process and the chosen substitution list of predetermined type being unified.

1 Claim, 4 Drawing Sheets

Lemma 10.5.2 Given a many-sorted first-order language L, for every set $T$ of many-sorted formulae in L and for every many-sorted formula $A$ in L, $$T \vdash A \text{ iff}$$
$$T' \cup MS \vdash A', \text{ in the translated one-sorted language L}',$$

where $T'$ is the set of formulae in $T$ translated into one-sorted formulae, and $A'$ is the one-sorted translation of $A$. □

FIG. 4

AUTOMATED MANY-SORTED THEOREM PROVER

FIELD OF THE INVENTION

The present invention generally relates to the field of information processing and artificial intelligence and, more particularly, to a method and an apparatus of automated theorem proving for solving a decision problem in which a provability of a proposition concerning relationships defined among physical objects is automatically judged on a basis of a given set of knowledge of the physical objects.

BACKGROUND OF THE INVENTION

Automatic many-sorted theorem proving is the process of getting a computer to agree that a particular theorem in many-sorted first-order logic is true. Conventional theorem provers that are based on resolution try to derive the empty clause from a set of clauses.

However, there are situations in which it is desirable to express properties of structures of different types (or sorts). For instance, this is the case if one is interested in axiomatizing data structures found in computer science (integers, reals, characters, stacks, queues, lists, etc). By adding to the formalism of first-order logic the notion of type (also called sort), one obtains a flexible and convenient logic called many-sorted first-order logic, which enjoys the same properties as first-order logic.

Currently, conventional theorem provers deal with many-sorted logic by standard translation to first-order logic. However, a problem with this approach is that, after the translation, the algorithm works within one domain. Working within one domain can result in an increase in the search space and slow down the search portion of the algorithm.

An example of background art in this technology area is the paper entitled: "A More Expressive Formulation of Many Sorted Logic," by Anthony G. Cohn that suggests many-sorted logics can increase deductive efficiency by eliminating useless branches of the search space, but usually this results in reduced expressiveness. The many-sorted logic described in Cohn has several unusual features which not only increase expressiveness but also can reduce the search space even more than a conventional many-sorted logic.

SUMMARY OF THE INVENTION

An embodiment of the invention is a method for automatic proving using many-sorted first-order logic, comprising: applying a modified method of resolution of first-ordered logic, wherein the method of resolution further comprises: processing at least one first sentence (P1) and at least one second sentence (Q1), wherein each of the at least one first sentence and the at least one second sentence contain literals (Pi, Qi); restricting a unifying process in the method of resolution; determining the literals (Pi) of the at least one first sentence; negating the literals (Qi) of the at least one second sentence of the restricted unifying process; providing the determined literals (Pi') and negated literals (Qi") to the restricted unifying process; choosing a substitution list in the restricted unifying process with a predetermined type; and deriving a resolvent sentence in response to the restricted unifying process and the chosen substitution list of predetermined type being unified.

In embodiments of the invention is defined by the following example. Suppose that the first sentence is Q(x)∨P(x) and the second sentence is ¬P(a)∨R(y), then the resolvent sentence is Q(a)∨R(y). Further, in embodiments of the invention, the unification in first-order logic takes two literals P1, Q1 and searches for substitutions list theta that unifies them. The restricted unify process restricts the search for substitutions list theta with respect to the type of the variables and terms, i.e. if a variable x has type A and a term f( . . . ) has type B different from A, then the restricted unify process will not try to substitute f( . . . ) to x.

BRIEF DESCRIPTION OF THE DRAWINGS

The invention can be described in greater detail with the aid of the following drawings.

FIG. 4 is a formula for translation of many-sorted logic to first-ordered logic.

DETAILED DESCRIPTION OF THE PREFERRED EMBODIMENT

Figure 1:
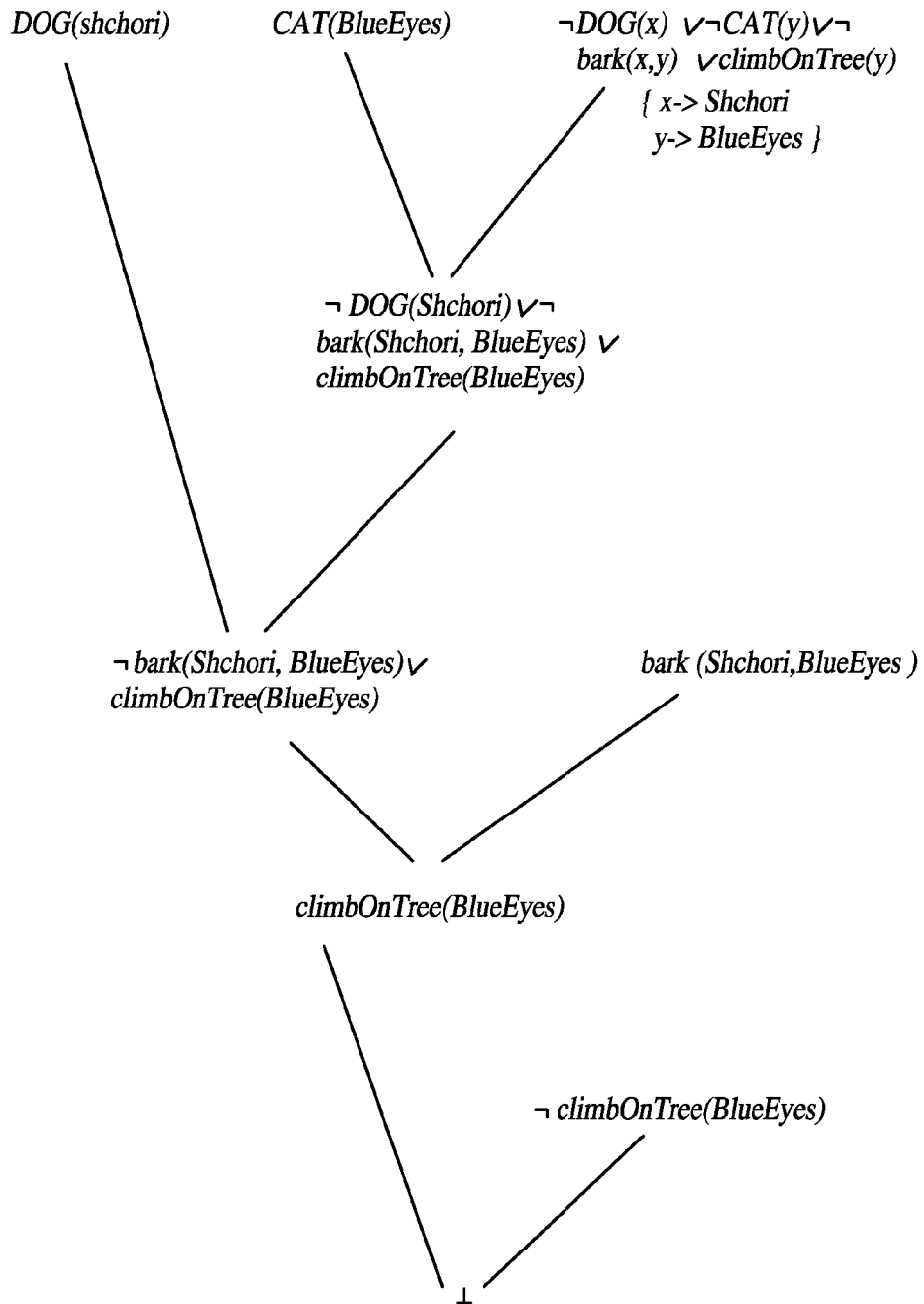
FIG. 1 illustrates the derivation tree for a conventional first-order theorem solver of Example 1 with a domain that contains two constants {Shchori, BlueEyes}.

An overview of some of the concepts behind embodiments of the invention is discussed in the following paragraphs. First, it should be noted, in the more expressive many-sorted logic disclosed in the background art of Cohn discussed above, the quantifiers are unsorted and the restriction on the range of a variable derives from the argument positions. In contrast, to Cohn, embodiments of the claimed invention utilize conventional many-sorted logic, where the quantifiers are sorted and the restriction on the range of the variables actually comes from the quantifiers.

In contrast to standard first-order logic, in many-sorted first-order logic, the arguments of function and predicate symbols may have different types (or sorts), and constant and function symbols also have some type (or sort). Some additional background for the many-sorted first-order logic of embodiments of the invention is provided in the following paragraphs.

The alphabet of a many-sorted first-order logic consists of the following sets of symbols:

A countable set S of sorts (or types);

Logical connectives: and, or, implication(=>) equivalence (=) and not;

Quantifiers: For every sort s in S: forall: s (for all), exists: s (there exists);

For every sort s in S, the equality symbol: =s;

Variables: For every sort s in S: a countably infinite set of variables Vs={xs1, xs2 . . . } for each of type s;

Auxiliary symbols: "("and")";

Function symbols: For every sort s in S, a (countable, possibly empty) set of function symbols Fs={fs1, fs2, . . . }, where each function fsi has type fsi: S+→s;

Constants: For every sort s in S, a (countable, possibly empty) set of constants Cs={cs1, cs2, . . . } each of type s; and Predicate symbols: For every sort s in S, a (countable, possibly empty) set of predicate symbols Ps={ps1, ps2, . . . }, where each predicate psi has string u subset of S* called the arity of psi.

The number and types of arguments in function (predicate) will be as number and types of types appeared in S+(u). It is assumed that the sets Vs, Fs, Cs, and Ps are disjoint for all s in S. The function letters applied to the variables and individual constants with appropriate types generate terms:

Variables and individual constants are terms.
If f: s1 x s2 x ... x sn→s and t1, ..., tn are terms of types s1, ..., sn appropriately, then f(t1, ..., tn) are term of type s.

In well-formed atomic formulas:
If psi is a predicate letter with arity s1, ..., sn and t1, ..., tn are terms of types s1, ..., sn appropriately, then psi(t1, ..., tn) is wfs; and
If A and B are wfs and xsi is a variable, then: not A, A=>B, for all xsi:s| A, and exists xsi:s| B are wfs.

Further, let L be a many sorted first-order language and model M of L consists of the following ingredients:

For every sort s in S non-empty set Ds, called the domain of M.
For every predicate letter psi of L with arity s1, ..., sn, an assignment of an n-place relation psiM in Ds1 x ... x Dsn.
For every function letter fsi of L with type fsi: s1x s2 x ... x sn→s, an assignment of an n-place operation fsiM in Ds1x ... x Dsn→Ds.
For every individual constant csi of L an assignment of some fixed element csiM of Ds.

In addition, an approach to the reduction or translation of many-sorted logic to first-order logic is shown if FIG. 4. Note that first-order logic is the same as one-sorted logic referred to in FIG. 4.

Any syntax or definitions not covered in the following paragraphs should be considered to be those of conventional first order logic, as disclosed in "Logic and Structure" by Dirk van Dalen, which is hereby incorporated by reference. In addition, the resolution rule for first-order logic (FOL) is as follows:

Given at least one first sentence (P1 or ... or Pn) and at least one second sentence (Q1 or ... or Qm), where each Pi and Qi is a literal (i.e., a positive or negated predicate symbol with its terms),
If Pj and not Qk unify with substitution list Theta,
Then derive the resolvent sentence:
subst(Theta, P1 v ... v Pj−1 v Pj+1 v ... v Pn v Q1 v ... v Qk−1 v Qk+1 v ... v Qm),
where subst(Theta, alpha) denotes the result of applying a set of substitutions defined by Theta to the sentence alpha for some substitution Theta and sentence alpha. For example, suppose that Theta is substitution that replaces variable x with a constant a, then subst(Theta, P(x) or Q(y))=P(a) or Q(y).

Further, in contrast to resolution for FOL embodiments of the invention, the unify process is restricted and the potential substitution list theta is considered only if theta has the appropriate type. That is, suppose that L1 and L2 are an input to the restricted unify process, then the algorithm searches for substitution theta that unifies L1 and L2, but instead trying all the substitutions the algorithm tries only the substitution theta that assigns to a of substitutions and therefore is more efficient. The benefits of this approach are demonstrated in the examples below.

Example 1 below shows a conventional automated theorem solver, that examines the following hypothesis and conclusion:

EXAMPLE 1

Conventional First-Order Logic Automated Theorem Solver

Hypotheses:
forall x:DOG forall y:CAT bark(x,y)→climbOnTree(y)
bark (Shchori, BlueEyes)

Conclusion:
climbOnTree(BlueEyes).
After translating to first-order logic, the clausal form for Example 1 is:

---

DOG(x) _ CAT(x)
¬DOG(x) _ ¬CAT(x)
¬DOG(x) _ ¬CAT(y) _ ¬bark(x,y) _ climbOnTree(y)
bark (_____, BlueEyes )
CAT(BlueEyes)
DOG(_____)

---

The negation of the conclusion is:
¬climbOnTree(BlueEyes).

In the case of conventional first-order logic, the domain for this example contains two constants {Shchori, BlueEyes} and the derivation tree is shown in FIG. 1. As illustrated in FIG. 1, working with one domain containing both {Shchori, BlueEyes} dramatically increases the search space. For example, assignment of 'Shchori' to the first argument of predicate 'bark' is a valid assignment.

In contrast to the conventional theorem solver of Example 1, having derivation tree, as shown in FIG. 1, embodiments of the invention improve the method of verifying many-sorted formulas of conventional theorem provers by using the knowledge of sorts. In particular, the algorithm remembers the sort for each variable and then uses the fact that different sorts are disjoint. Thus, the algorithm does not substitute term with one sort to a variable with another sort. Therefore, by using the knowledge of sorts, the search space of the theorem prover of embodiments of the invention is reduced as compared with those of conventional theorem provers.

In particular, the search space of the claimed invention is reduced by considering the fact that each sort has different domain and elements of one sort cannot be assigned to variables of other sorts. This reduction is illustrated by the implementation of the Example 1 using the method of embodiments of the claimed invention as shown in Example 2 below.

EXAMPLE 2

Many-Sorted First-Order Logic Version of Example 1 using an Exemplary Embodiment of the Method of the Invention The many-sorted first order logic clausal form of Example 1 is given by:

---

¬bark(x,y) _ climbOnTree(y)
bark (Shchori, BlueEyes )

---

Negation of the conclusion:
¬climbOnTree(BlueEyes)
where x is a variable of type DOG;
y is a variable of type CAT;
BlueEyes is a constant of type CAT; and
Shchori is a constant of type DOG.

Thus, a valid assignment is only an assignment that assigns Shchori_to_x and BlueEyes to y. This easily follows from the fact that the herbarand model contains only two elements: one BlueEyes of type CAT and Shchori of type DOG, and the fact that the formula contains only two variables: x of type DOG and y of type CA T Therefore x can get only Shchori and y can get only BlueEyes.

Figure 2:
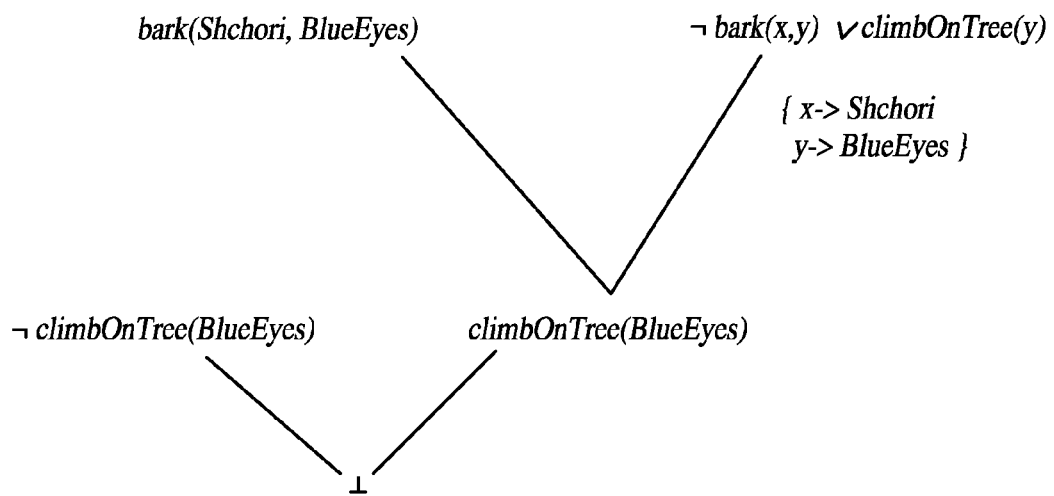
FIG. 2 illustrates the derivation tree for an exemplary many-order theorem solver of Example 1 with a domain that contains two constants {Shchori, BlueEyes}.

The derivation tree for Example 2 is given in FIG. 2. Comparing the first-order version of the derivation tree of conventional theorem solvers of FIG. 1 to the many-sorted derivation tree method of the embodiments of the invention of FIG. 2 clearly illustrates that by applying the many-sorted version derivation tree to the same problem of Example 1 results in a shorter derivation tree and thus, a faster, more efficient search algorithm for the theorem solver. In addition, the many-sorted version of the derivation tree of FIG. 2 is the only valid tree. In contrast, the first-order version, as can be seen in FIG. 1, has many valid derivation trees. Thus, the search space is larger for the conventional first-order version.

Figure 3:
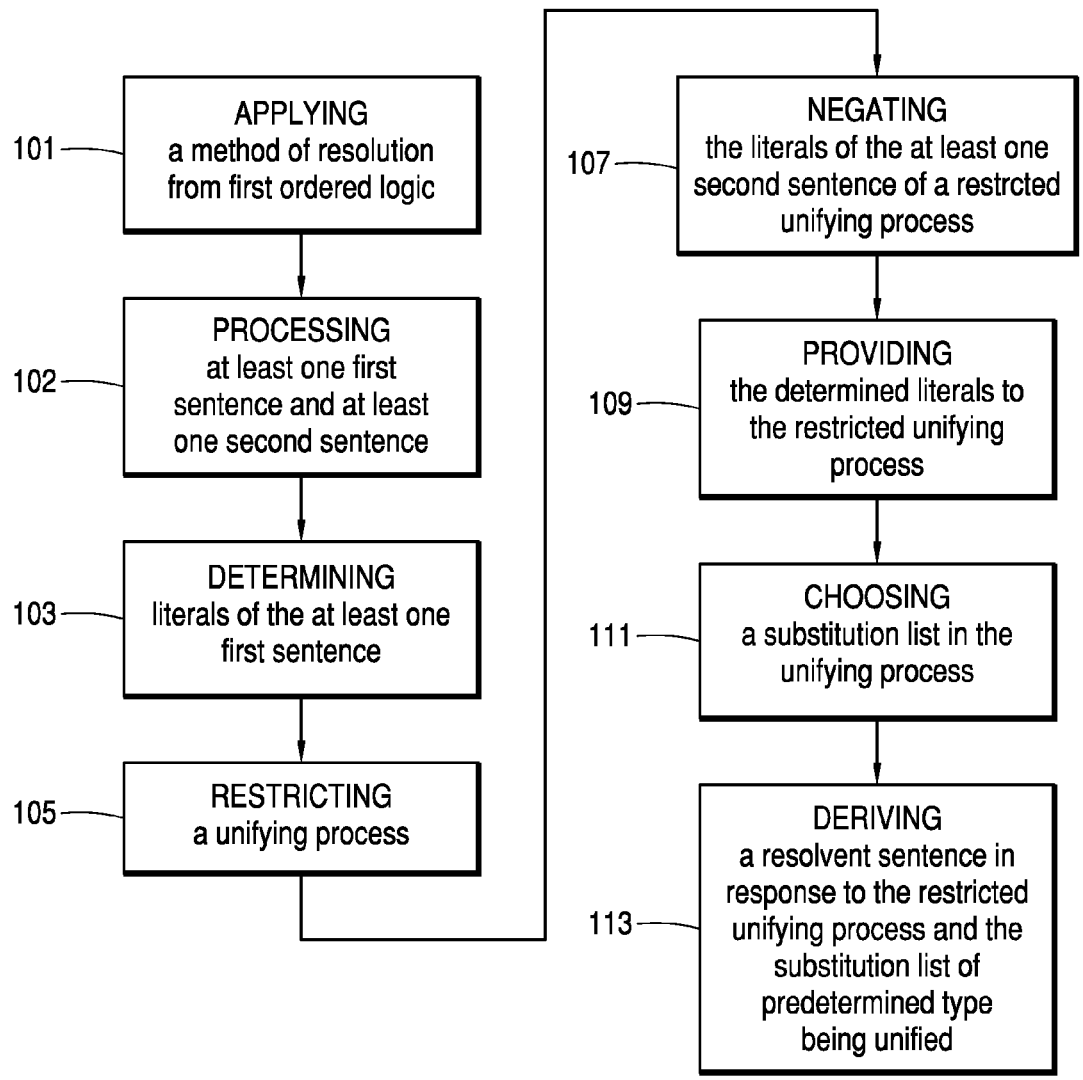
FIG. 3 illustrates an exemplary flow diagram for an embodiment of the method of the invention.

FIG. 3 discloses an exemplary flow chart for the method of embodiments of the invention. In particular, step 101 involves applying a modified method of resolution of first-ordered logic. Step 102 is processing at least one first sentence (P1) and at least one second sentence (Q1), wherein each of the at least one first sentence and the at least one second sentence contain literals (Pi, Qi). Restricting a unifying process in the method of resolution is given in step 105. Step 103 is determining the literals (Pi) of the at least one first sentence. Negating the literals (Qi) of the at least one second sentence of the restricted unifying process occurs in step 107. Step 109 is providing the determined literals (Pi') and negated literals (Qi") to the restricted unifying process. A substitution list in the restricted unifying process with a predetermined type is chosen in step 111. Step 113 is deriving a resolvent sentence in response to the restricted unifying process and the chosen substitution list of predetermined type being unified.

The foregoing description illustrates and describes embodiments of the present invention. Additionally, the disclosure shows and describes only the preferred embodiments of the invention, but as mentioned above, it is to be understood that the invention is capable of use in various other combinations, modifications, and environments and is capable of changes or modifications within the scope of the inventive concept as expressed herein, commensurate with the above teachings and/or skill or knowledge of the relevant art. The embodiments described hereinabove are further intended to explain best modes known of practicing the invention and to enable others skilled in the art to utilize the invention in such or other embodiments and with the various modifications required by the particular applications or uses of the invention. Accordingly, the description is not intended to limit the invention to the form or application disclosed herein. Also, it is intended that the appended claims be construed to include alternative embodiments.

In addition, embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include, but are not limited to, compact disk read only memory (CDROM), compact disk-read/write (CD-RIW) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The invention claimed is:

1. A method for automatic proving using many-sorted first-order logic, comprising:
    applying a modified method of resolution of first-ordered logic, executed as software on electronic computer hardware, wherein the modified method of resolution further comprises:
        processing, executed as software on electronic computer hardware, at least one first sentence (P1) and at least one second sentence (Q1), wherein each of the at least one first sentence and the at least one second sentence contain literals (Pi, Qi);
        restricting, executed as software on electronic computer hardware, at a unifying process in the modified method of resolution;
        determining, executed as software on electronic computer hardware, at the literals (Pi) of the at least one first sentence;
        negating, executed as software on electronic computer hardware, at the literals (Qi) of the at least one second sentence of the restricted unifying process;
        providing, executed as software on electronic computer hardware, at the determined literals (Pi') and negated literals (Qi") to the restricted unifying process;
        choosing, executed as software on electronic computer hardware, at a substitution list in the restricted unifying process with a predetermined type; and
        deriving, executed as software on electronic computer hardware, at a resolvent sentence in response to the restricted unifying process and the chosen substitution list of predetermined type being unified.

* * * * *